(12) United States Patent
Chang et al.

(10) Patent No.: US 6,519,447 B1
(45) Date of Patent: Feb. 11, 2003

(54) APPARATUS FOR CONNECTION OF A HIGH-POWER AND A LOW-POWER RADIO TELEPHONE NETWORK

(75) Inventors: Chun-Ming Chang, Hsinchu (TW); Chao-Yin Liu, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/429,873

(22) Filed: Oct. 29, 1999

(51) Int. Cl.[7] ................................................ H04B 7/15
(52) U.S. Cl. ........................ 455/11.1; 455/74; 455/553
(58) Field of Search ................................ 455/11.1, 421, 455/422, 74, 552, 553, 575, 90, 229, 557, 550, 460, 461, 462, 464

(56) References Cited

U.S. PATENT DOCUMENTS 5,228,074 A * 7/1993 Mizikousky ................. 455/74
5,351,270 A * 9/1994 Graham et al. ............. 455/422
5,490,284 A * 2/1996 Itoh et al. ................... 455/11.1
5,848,353 A * 12/1998 Matsumoto .................. 455/74

* cited by examiner

*Primary Examiner*—Thanh Cong Le
(74) *Attorney, Agent, or Firm*—Fish & Richardson P.C.

(57) ABSTRACT

The invention provides a base station for connection of a low-power and a high-power radio telephone network. The high-power radio telephone network comprises a first and a second terminal, while the low-power radio telephone network comprises a third terminal. The first terminal has a first interface for communication with an external device. The base station, which operates for the low-power radio telephone network, has a second interface compatible to the first interface, and communicates with the first terminal of the high-power radio telephone network through the connection of the first and second interface. Therefore, the third terminal of the low-power radio telephone network communicates with the second terminal of the high-power radio telephone network under the operation of the first terminal and the base station.

9 Claims, 3 Drawing Sheets

APPARATUS FOR CONNECTION OF A HIGH-POWER AND A LOW-POWER RADIO TELEPHONE NETWORK

FIELD OF THE INVENTION

The present invention is related to radio communication, and more particularly to an apparatus and method for connection of a high-power and low-power radio telephone network.

DESCRIPTION OF THE RELATED ART

Nowadays, high-power radio telephone networks including GSM, AMPS, CDMA and satellite telephone network are well known. They are usually for public use in a large area. FIG. 1 partially shows a GSM network 10. The GSM network 10 comprises a base station 12 and mobile terminals within its covered area, such as a GSM handset 14. The GSM handset 14 communicates with another GSM mobile terminal under the operation of the base station 12.

Low-power radio telephone networks including PABX, KTS, HomeBase, DECT, PHS and PACS are also well known. They are usually for private use in a small area. FIG. 2 partially shows a DECT network 20 which is similar to the GSM network 10 in FIG. 1. The DECT network 20 comprises a base station 22 and mobile terminals within its covered area, such as a DECT handset 24. The DECT handset 24 communicates with another DECT mobile terminal under the operation of the base station 22. In the GSM network 10, the base station 12 is typically immobile and disposed in predetermined position. Contrarily, in the DECT network 20, the base station 22 is designed to be mobile or portable for fast setting up of a communication network in a small area.

As mentioned above, although a communication network of DECT can be fast and quickly set up, its coverage area is limited. As a remedy for that, it possible that a DECT network user can talk with a GSM subscriber. Traditionally, this is carried out by setting up a connection between two respective base stations through a wire telephone network. However, such a connection requires much time and work, and the DECT network user cannot talk with the GSM subscriber if there is no wire telephone network available in the neighborhood.

SUMMARY OF THE INVENTION

It is therefore an object of the invention to provide a simplified method and apparatus for connection between two base stations of two respective radio telephone networks.

To accomplish the above objective, the present invention provides a base station for connection of a low-power and a high-power radio telephone network. The high-power radio telephone network comprises a first and a second terminal, while the low-power radio telephone network comprises a third terminal. The first terminal has a first interface for communication with an external device. The base station, which operates for the low-power radio telephone network, has a second interface compatible to the first interface, and communicates with the first terminal of the high-power radio telephone network through the connection of the first and second interface. Therefore, the third terminal of the low-power radio telephone network communicates with the second terminal of the high-power radio telephone network under the operation of the first terminal and the base station.

The present invention also provides a method for connection of a low-power and a high-power radio telephone network. The method comprises two steps. First, a base station is provided. The base station operates for the low-power radio telephone network and comprising a second interface compatible to the first interface for communication with the first terminal. Second, the first and second interface are connected together. Thus, the third terminal of the low-power radio telephone network communicates with the second terminal of the high-power radio telephone network under the operation of the first terminal and the base station.

Accordingly, in the present invention, the base station of the low-power radio telephone network can be directly connected to one of the terminals of the high-power radio telephone network. Thus, the connection of a low-power and a high-power radio telephone network can be easily set up and there is no need for a wire telephone network.

Other objects, features, and advantages of the present invention will become apparent from the following detailed description which makes reference to the accompanying drawings.

DESCRIPTION OF THE PREFERRED EMBODIMENTS

Now in keeping with the objective of this invention, the method and apparatus for connection of a low-power and a high-power radio telephone network are described in detail.

Figure 2:
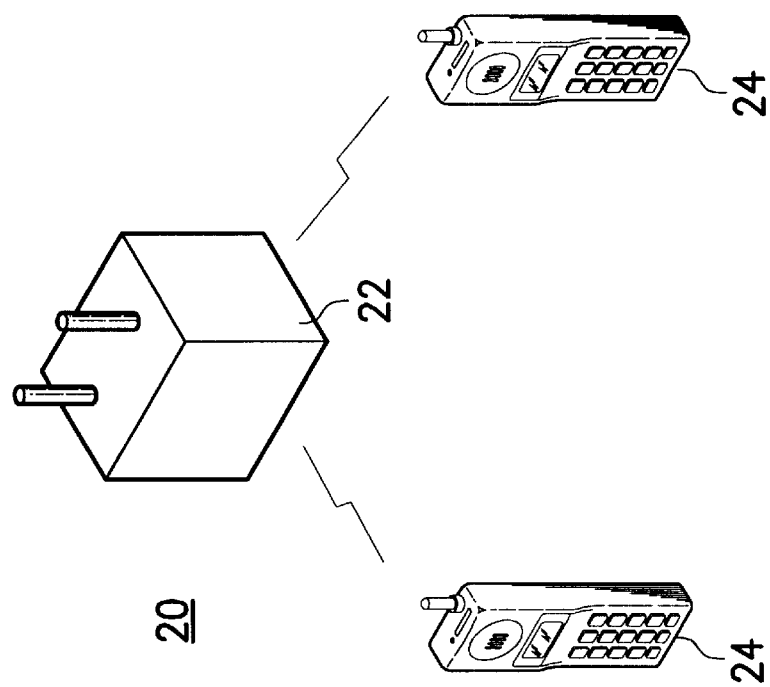
FIG. 2 schematically shows part of a DECT radio telephone network.
Figure 1:
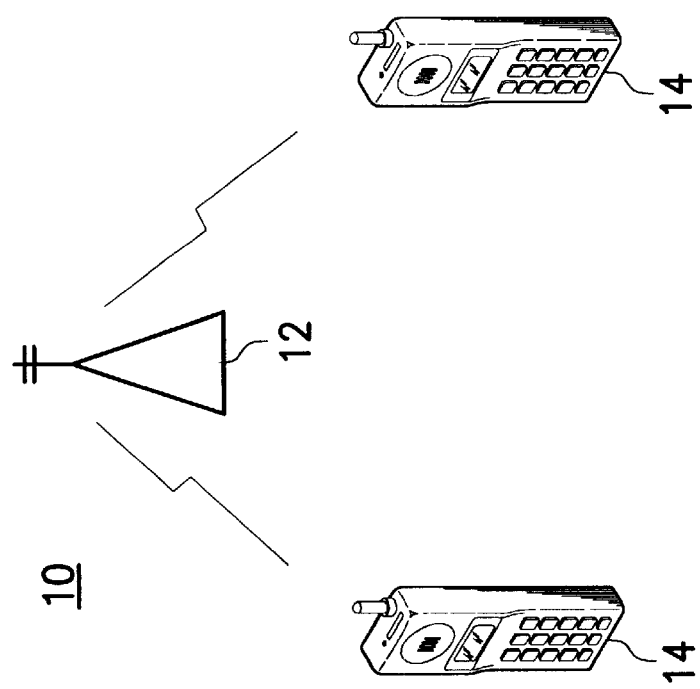
FIG. 1 schematically shows part of a GSM radio telephone network.
Figure 3:
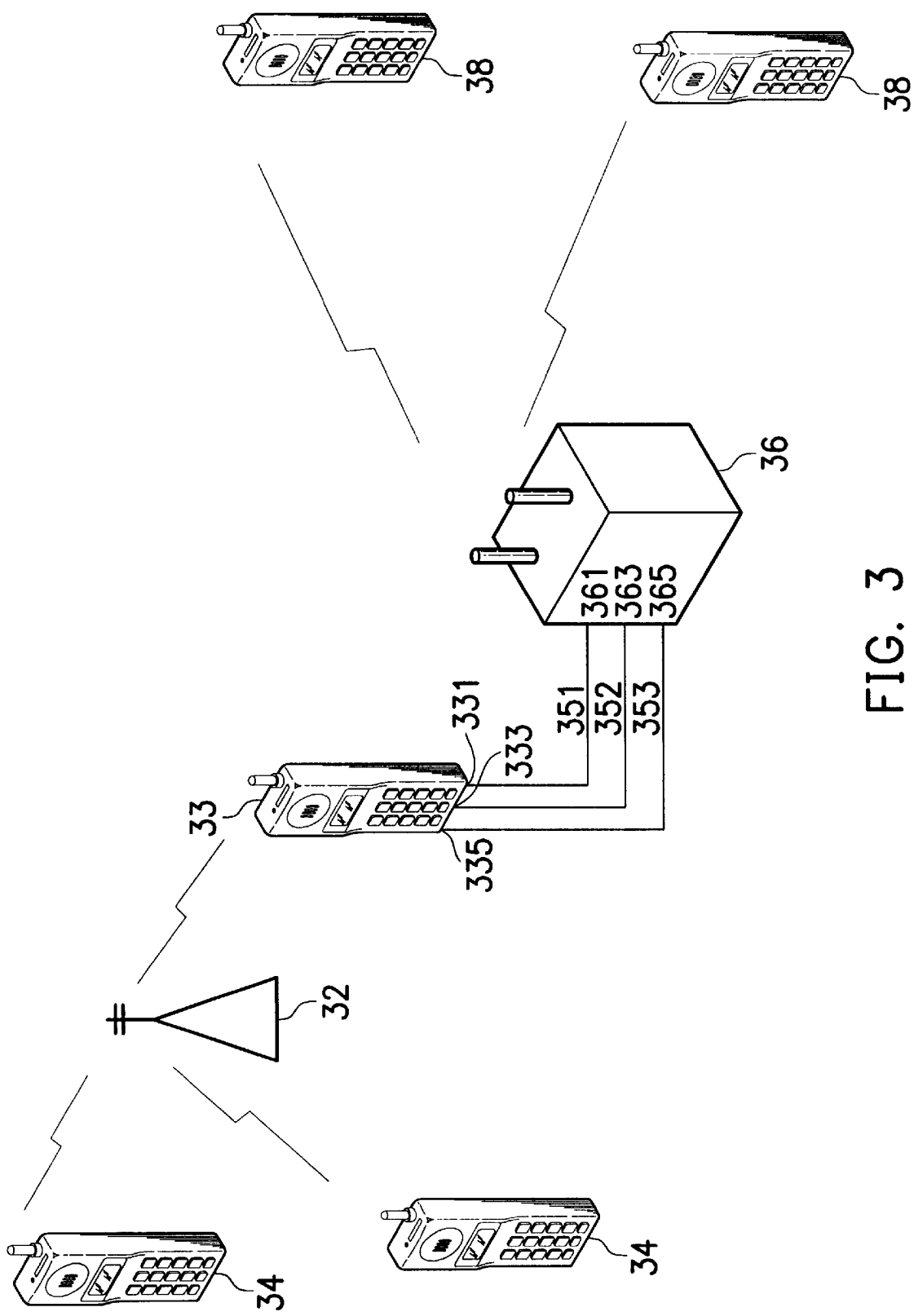
FIG. 3 shows a radio telephone network according to the invention.

Referring to FIG. 3, a radio telephone network comprises a GSM base station 32, GSM handset 33, 34, a DECT base station 36, and a DECT handset 38. The GSM handset 33 has an audio output port 331, audio input port 333 and control signal port 335, while the DECT base station 36 comprises an audio input port 361, audio output port 363 and control signal port 365. The audio output port 331, audio input port 333 and control signal port 335 are connected to the audio input port 361, audio output port 363 and control signal port 365 by the connections 351, 352 and 353, respectively. The connection 353 may be implemented with an existing data suit of the GSM handset 33, such as RS-232 or IrDA infrared port. Alternately, the connection 353 may be implemented with hardwired lines which connect the keypad scan pin and ringer signal output of the GSM handset 33 to the control pin and ringer signal input of the DECT base station 36 respectively.

The DECT base station 36 will dial using the GSM handset 33 in response to one of the DECT handsets, the DECT handset 38 for example. Thus, it is possible for the DECT network user to give a call to one of the GSM subscribers using the DECT handset 38. On the other hand, the GSM handset 33 will instruct the DECT base station 36 to ring all the DECT handsets when receiving a call from one of the GSM handsets, the GSM handset 34 for example. Thus makes it possible for the GSM subscriber to give a group call to the DECT network users using the GSM handset 34.

Figure 4:
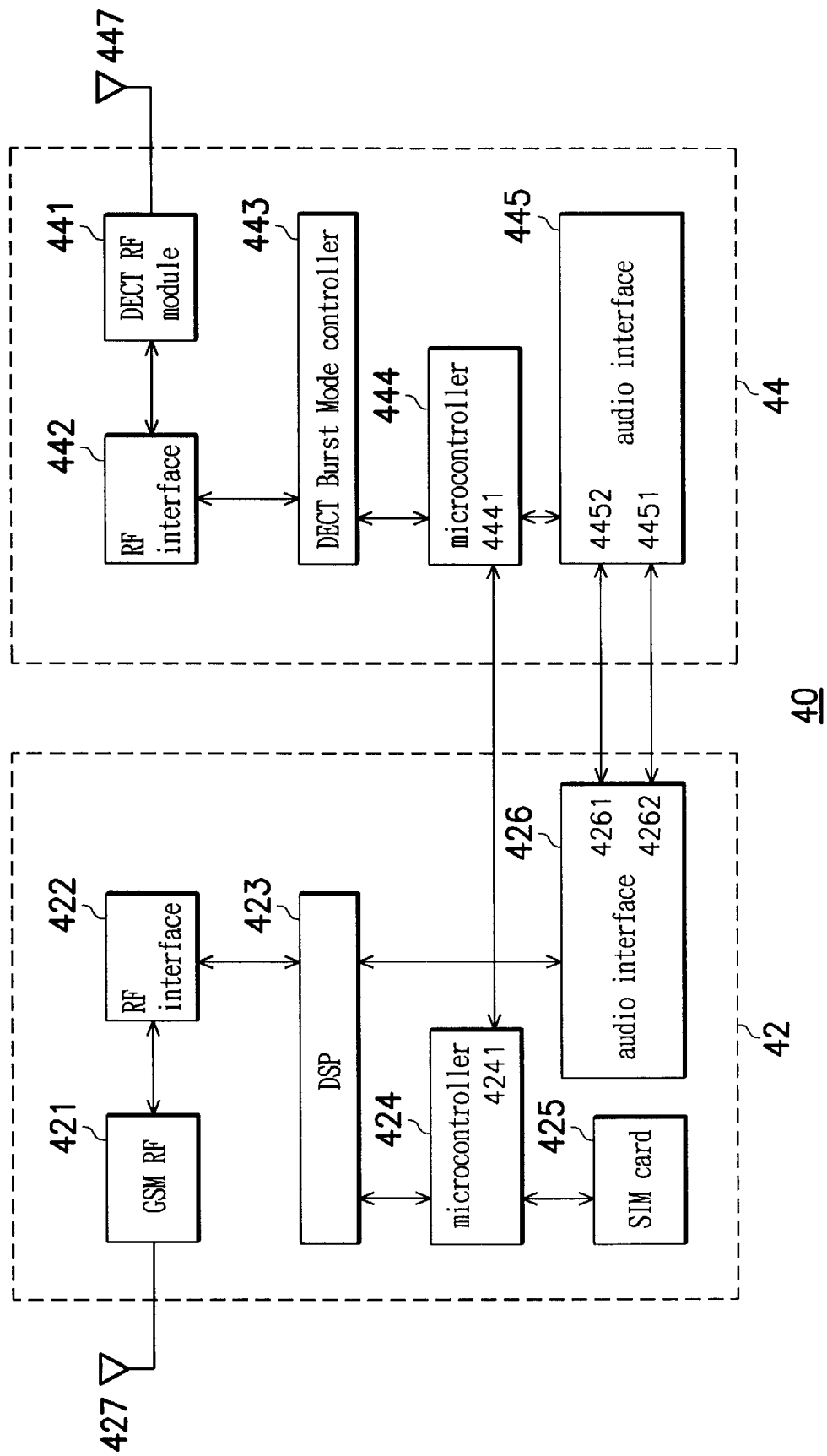
FIG. 4 shows a DECT base station integrated with a GSM terminal according to the invention.

Alternately, the DECT base station 36 is integrated with the GSM handset 33. Referring to FIG. 4, an integrated apparatus 40 comprises a GSM handset unit 42 and a DECT base station unit 44. The GSM handset unit 42 comprises a GSM RF block 421, a RF interface 422, a DSP 423, a microcontroller 424, a SIM card 425, an audio interface 426 and an antenna 427. The DECT base station unit 44 comprises a DECT RF module 441, a RF interface 442, a DECT Burst Mode controller 443, a microcontroller 444, an audio interface 445 and an antenna 447. It is noted that the microcontroller 424 and 444 have asynchronous serial ports 4241 and 4441, while the audio interface 426 and 445 have Mic audio ports 4261, 4451 and Speaker audio ports 4262, 4452, respectively. The asynchronous serial port 4241, Mic audio port 4261 and Speaker audio port 4262 of the GSM handset unit 42 are connected to the asynchronous serial port 4441, Mic audio port 4451 and Speaker audio port 4452 of the DECT base station unit 44 respectively.

According to the invention, the method for connection of a low-power and a high-power radio telephone network will be explained.

First, a DECT base station is provided. The DECT base station operates for the communication between terminals of the DECT network, such as two DECT handsets.

Second, the DECT base station is provided with an interface for the connection and hence the communication of a GSM handset and the DECT base station.

Finally, the GSM handset is connected to the DECT base station so that a DECT handset can communicate with another GSM handset under the operation of the DECT base station and the GSM handset connected thereto.

While the invention has been particularly shown and described with the reference to the preferred embodiment thereof, it will be understood by those skilled in the art that an AMPS, CDMA or satellite telephone network substituted for the GSM network and a PHS or PACS network substituted for the DECT network apply to the invention. Various changes in form and details may be made without departing from the spirit and scope of the invention.

What is claimed is:

1. An apparatus for connection of a low-power and a high-power radio telephone network, the high-power radio telephone network comprising a first and a second terminal, and the low-power radio telephone network comprising a third terminal, wherein the first terminal has a first interface for communication with an external device, the apparatus comprising:

a base station with which the first terminal is integrated, operating for the low-power radio telephone network, having a second interface compatible to the first interface, communicating with the first terminal of the high-power radio telephone network in response to the third terminal of the low-power radio telephone network through the connection of the first and second interface, whereby the third terminal of the low-power radio telephone network communicates with the second terminal of the high-power radio telephone network under the operation of the first terminal and the base station;

wherein the first and the second interface both comprise a Mic Audio port, a Speaker Audio port and an Asynchronize Serial Port, the Mic Audio port, Speaker Audio port and Asynchronize Serial Port of the first interface are respectively connected to the Speaker Audio port, Mic Audio port and Asynchronize Serial Port of the second interface.

2. The apparatus as claimed in claim 1, wherein an audio signal and a control signal are transferred through the first and second interface.

3. The apparatus as claimed in claim 2, wherein the first and second interface both comprise ports for the audio and control signal.

4. The apparatus as claimed in claim 3, wherein the ports for the audio signal are an audio input and an audio output.

5. The apparatus as claimed in claim 3, wherein the ports for the control signal of the first and second interface connect with each other using an existing data suit of the first terminal.

6. The apparatus as claimed in claim 3, wherein the ports for the control signal of the first and second interface connect with each other by hardwired lines.

7. The apparatus as claimed in claim 6, wherein the port for the control signal of the first interface comprises a keypad scan pin and a ringer signal output, while the port for the control signal of the second interface comprises a control pin and a ringer signal input that respectively connects to the keypad scan pin and the ringer signal output of the first interface.

8. The apparatus as claimed in claim 1, wherein the first and the second terminals are GSM handsets.

9. The apparatus as claimed in claim 1, wherein the third terminal is a DECT handset.

* * * * *